(12) United States Patent
Saund

(10) Patent No.: US 7,177,483 B2
(45) Date of Patent: Feb. 13, 2007

(54) SYSTEM AND METHOD FOR ENHANCEMENT OF DOCUMENT IMAGES

(75) Inventor: Eric Saund, San Carlos, CA (US)

(73) Assignee: Palo Alto Research Center Incorporated., Palo Alto, CA (US)

( * ) Notice: Subject to any disclaimer, the term of this patent is extended or adjusted under 35 U.S.C. 154(b) by 849 days.

(21) Appl. No.: 10/396,223

(22) Filed: Mar. 24, 2003

(65) Prior Publication Data

US 2004/0042680 A1 Mar. 4, 2004

Related U.S. Application Data

(60) Provisional application No. 60/407,433, filed on Aug. 29, 2002.

(51) Int. Cl.
G06K 9/20 (2006.01)
G06K 9/36 (2006.01)
G06K 9/40 (2006.01)

(52) U.S. Cl. ........................ 382/282; 382/274

(58) Field of Classification Search ................ 382/282, 382/283, 284, 175, 176, 274; 348/218.1, 348/239; 358/443, 464, 465
See application file for complete search history.

(56) References Cited

U.S. PATENT DOCUMENTS 5,528,290 A * 6/1996 Saund ................... 348/218.1
5,581,637 A * 12/1996 Cass et al. ................... 382/284
5,838,758 A * 11/1998 Krug et al. .................... 378/53
6,104,438 A * 8/2000 Saito .......................... 348/587
6,175,663 B1 * 1/2001 Huang ......................... 382/284
6,211,913 B1 * 4/2001 Hansen et al. .............. 348/239
6,366,316 B1 * 4/2002 Parulski et al. ............. 348/239
6,570,612 B1 * 5/2003 Saund et al. ............. 348/218.1

* cited by examiner

*Primary Examiner*—Yon J. Couso
(74) *Attorney, Agent, or Firm*—Linda M. Robb

(57) ABSTRACT

A method for enhancing electronic images of a document, in which the electronic images contain a background with foreground markings, includes receiving an electronic image containing pixels and assigning an initial provisional foreground/background status to the pixels. The initial foreground/background estimate is revised and a determination is made as to whether the revised foreground/background estimate is to be the final status assignment for the pixels of the image. If a final pixel status assignment has not been achieved, the estimate is again revised until a final foreground/background status is reached for the image pixels prior to creation of an output image.

29 Claims, 11 Drawing Sheets

SYSTEM AND METHOD FOR ENHANCEMENT OF DOCUMENT IMAGES

This application is based on a Provisional Patent Application No. 60/407,433 filed Aug. 29, 2002.

INCORPORATION BY REFERENCE

The following U.S. patent application is fully incorporated herein by reference: U.S. patent application. Ser. No. 09/158,443 to Saund et al. ("System and Method for Color Normalization of Board Images").

BACKGROUND OF THE INVENTION

This invention relates generally to a system and method for color normalization of digital camera images of documents. More particularly, the system and method are directed to enhancing the colors of digital camera images to correct for uneven lighting and contrast in such images.

While the invention is particularly directed to the art of image processing and color normalization, and will thus be described with specific reference thereto, it will be appreciated that the system and method disclosed herein may have usefulness in other fields and applications.

Document images, such as those of a whiteboard, blackboard, flip chart, drawings, or other images captured with a digital camera may suffer from uneven lighting and contrast. Image processing is required to correct for these effects and return an image to a form more comparable to that provided by a true document scanner. Existing techniques for automatic white balancing and contrast adjustment of these images, such as Autobalance in Microsoft Photo Editor, perform inadequately to this task because they apply a color tone adjustment uniformly across the image. Because the original illumination is non-uniform, color adjustment parameters are required that are non-uniform across the image. By way of illustration, FIG. 1 is a digital camera image of a hand-drawn artwork. Due to low and uneven illumination and the camera's estimate of white-balance, the digital camera image appears dark, with an uneven brown background, when compared to the original shown in FIG. 2. After processing the image of FIG. 1 with Autobalance, color is adjusted, as shown in FIG. 3, but the contrast adjustment is not sufficient when compared to FIG. 2. The background retains a yellow cast and the colors of the animals and their blankets is not in agreement with the original image shown in FIG. 2.

Techniques for color correcting images of whiteboards which are illuminated unevenly perform well for the thin linework made by marker pens, but fail when the image content consists of solid color regions as well as lines. An example of this is the commercial product, Whiteboard Photo, which enhances linework, but fails to adequately enhance solid color regions. For example, FIG. 4 is the output for the original artwork shown in FIG. 2 after processing with Whiteboard Photo, while FIG. 5 is the result of color normalization using the color normalization technique disclosed in U.S. patent application Ser. No. 09/158, 443, "System and Method for Color Normalization of Board Images," and used in the ZombieBoard whiteboard scanner application described in the technical report, "Saund, E., 'Bringing the Marks on a Whiteboard to Electronic Life', at http://Hwww.parc.com/saund/papers.html".

In FIG. 4, the background is now white, but the solid portions of the animals' bodies and their blankets is uneven and not an accurate match with the original of FIG. 2. In FIG. 5, the version of the digital camera input after processing with the ZombieBoard technique, the background is also now white, but again the solid portions of the animals and their blankets is uneven and inaccurate when compared with FIG. 2. These systems rely on high-pass filtering techniques, or their equivalent, to distinguish foreground from the ostensibly white background, which is assumed to be a uniform white color illuminated by a lighting source that varies gradually over the surface. As a result, the interiors of solid regions appear to be washed out after processing. However, neither of these solutions extends the technology of color normalization to images that contain solid color regions as well as thin linework.

The present invention provides a new and improved image processing method for color images which overcomes the problems associated with uneven illumination and a camera's estimate of white-balance, extending the technology of color normalization to images that contain solid color regions. An advantage of this invention is that it classifies all image pixels as being either foreground or background. This classification can be useful to applications whether or not color enhancement of foreground material is performed, for example, to cause background pixels to be rendered as transparent for purposes of combining and rearranging foreground image material.

SUMMARY OF THE INVENTION

Briefly stated, and in accordance with one aspect of the present invention, described herein is a method for enhancing electronic images of a document, in which the electronic images contain a background with foreground markings. The method includes receiving an electronic image containing pixels and assigning an initial provisional foreground/background status to the pixels. The initial foreground/background estimate is revised and a determination is made as to whether the revised foreground/background estimate is to be the final status assignment for the pixels of the image. If a final pixel status assignment has not been achieved, the estimate is again revised until a final foreground/background status is reached for the image.

In accordance with another aspect of the present invention, a system adapted to enhance electronic images of a document includes means for inputting an electronic image comprised of pixels into the system. Algorithm parameters are also provided to the system. A processor is connected for receiving requests for image enhancement and also for accessing a memory structure. The memory structure includes data memory and program memory, which contains a foreground/background separation module.

In accordance with yet another aspect of the invention, there is provided an article of manufacture in the form of a computer usable medium having computer readable program code embodied in the medium, such that, when the program code is executed by the computer, causes the computer to perform method steps for enhancement of electronic images of a document. The method includes receiving an electronic image and quantizing the image colors to yield a color table having a number of color table bins. At least one of the color table bins is identified as representing white. Provisional foreground status is assigned to pixels based on a hue/saturation/lightness comparison and also to pixels based on high-pass filtering. Provisional background status is assigned to those remaining image pixels. A white background pixel array is estimated and a final foreground/background status is assigned to the image pixels prior to creation of an output image.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing and other features of the instant invention will be apparent and easily understood from a further reading of the specification, claims and by reference to the accompanying drawings in which:

DETAILED DESCRIPTION OF THE INVENTION

Disclosed herein is a method and apparatus for performing color enhancement and background detection of a document image. In the following description numerous specific details are set forth in order to provide a thorough understanding of the present invention. It would be apparent, however, to one skilled in the art to practice the invention without such specific details. In other instances, specific implementation details, such as filtering an image, have not been shown in detail in order not to unnecessarily obscure the present invention.

As will become apparent in the description below, the present invention finds particular advantage in an interactive system for editing text and graphical material contained in a document image obtained from a scanner, digital camera, or other imaging device. It is also particularly useful for enhancing the appearance of images of whiteboards, flipcharts, and pages in a batch processing mode without user intervention.

Figure 6:
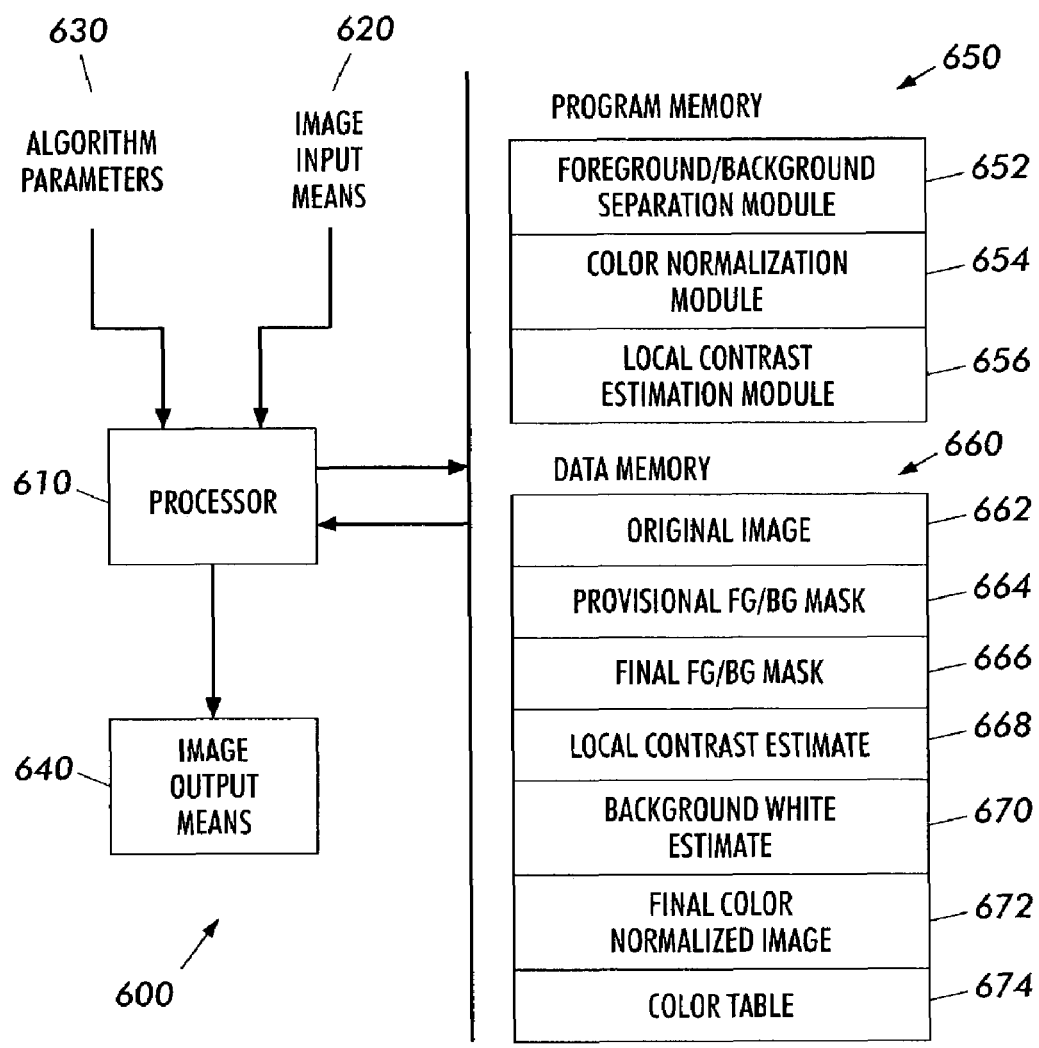
FIG. 6 is a block diagram showing general components of a system that can normalize color according to the system and method disclosed herein.

Referring now to FIG. 6, system 600 includes processor 610, connected to receive signals from image input means 620 and also to receive algorithm parameters 630. Image input means 620 could be a scanner, a facsimile receiver or other image receiver, a camera, or other appropriate device or could be a part of local or remote memory that stores an image in digital form. Algorithm parameters 630 may be received from a previously stored file, or from settings adjusted by the user via a graphical user interface, and provide the processor with the capability to invoke to various settings within the algorithms leading to different output results, according to user preferences. Processor 610 may also be connected to image output means 640, such as a screen display, a printer, a facsimile transmitter or other image transmitter, or a part of local or remote memory that can store an image in digital form. Processor 610 may be configured as a windows-type system.

Processor 610 is also connected to access program memory 650 and data memory 660. Program memory 650 includes foreground/background (FG/BG) separation module 652, color normalization module 654, and, optionally, a local contrast estimation module 656. Data memory 660 includes the original image 662, a provisional foreground/background mask 664, final foreground/background mask 666, local contrast estimate array 668, background white estimate array 670, final color normalized image 672, and color table 674. In executing the routines of FG/BG separation module 652, processor 610 loads data using image input means 620 into original image 662. In operation, the FG/BG separation module takes as input the original image and outputs the final foreground/background mask, making use internally of the provisional foreground/background mask and the background white estimate. The color normalization module takes as input the original image and the final foreground/background mask, and outputs the final color normalized image. The color normalization module makes use internally of the background white estimate. The color normalization module optionally invokes the local contrast estimation module, and in such case, it makes use of the local contrast estimate. The contrast estimation module takes as input the original image, the final foreground/background mask, and the background white estimate, and it outputs the local contrast estimate.

Figure 7:
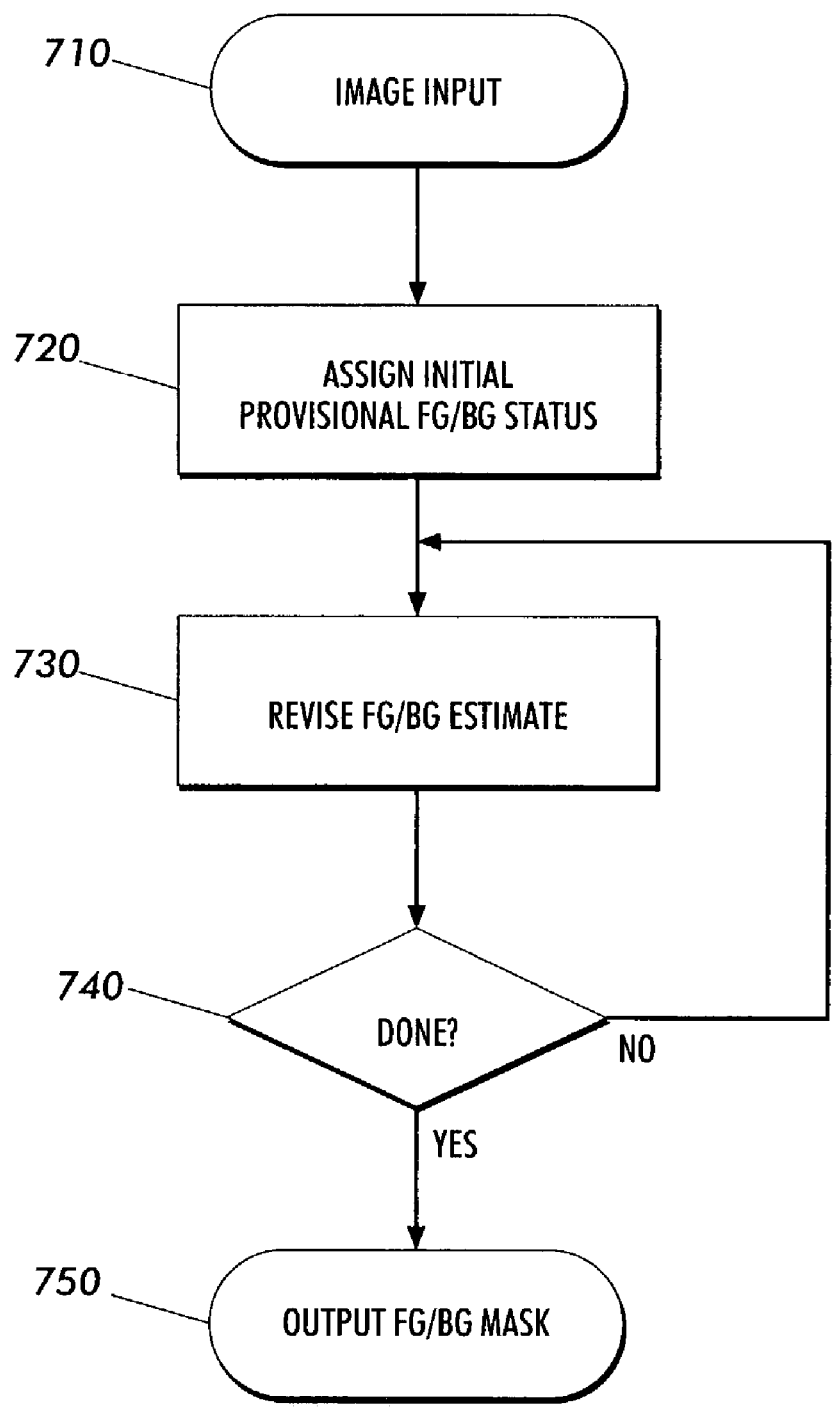
FIG. 7 is a flow chart showing steps in separating foreground and background pixels in electronic image material according to an embodiment of the method and system disclosed herein.

Referring now to FIG. 7, there is shown a flow chart illustrating the steps in distinguishing foreground markings from background in an electronic image according to one embodiment of the method and system disclosed herein. The foreground/background separation process begins with receipt of an image from an image-input means at step 710, into original image data memory 662. As discussed hereinabove, the image may be received from a scanner, a facsimile receiver or other image receiver, a camera, or other appropriate device, or could be a part of local or remote memory that stores an image in digital form. The foreground/background separation module operates by successive refinement of a provisional foreground/background assignment of pixel status. In step 720, pixels are initially classified as "provisional foreground" or "provisional background". This status is represented in the provisional foreground/background mask 664. In step 730, these provisional assignments are used to re-estimate pixels' status, yielding a revised foreground/background estimate in the foreground/background mask 664. At step 740 it is determined whether the revised foreground/background estimate is to be considered to be the module's final output. If so, at step 750 this data is transferred to Final FG/BG Mask 666. If at step 740 it is determined that a further refinement will be performed, then control passes again to step 730. It is not necessary that the processing performed at step 730 be the same each time this step is used. The module may maintain internal state information governing the number of times the re-estimation step 730 is called, and governing which of several re-estimation algorithms are applied at each step.

Figure 8:
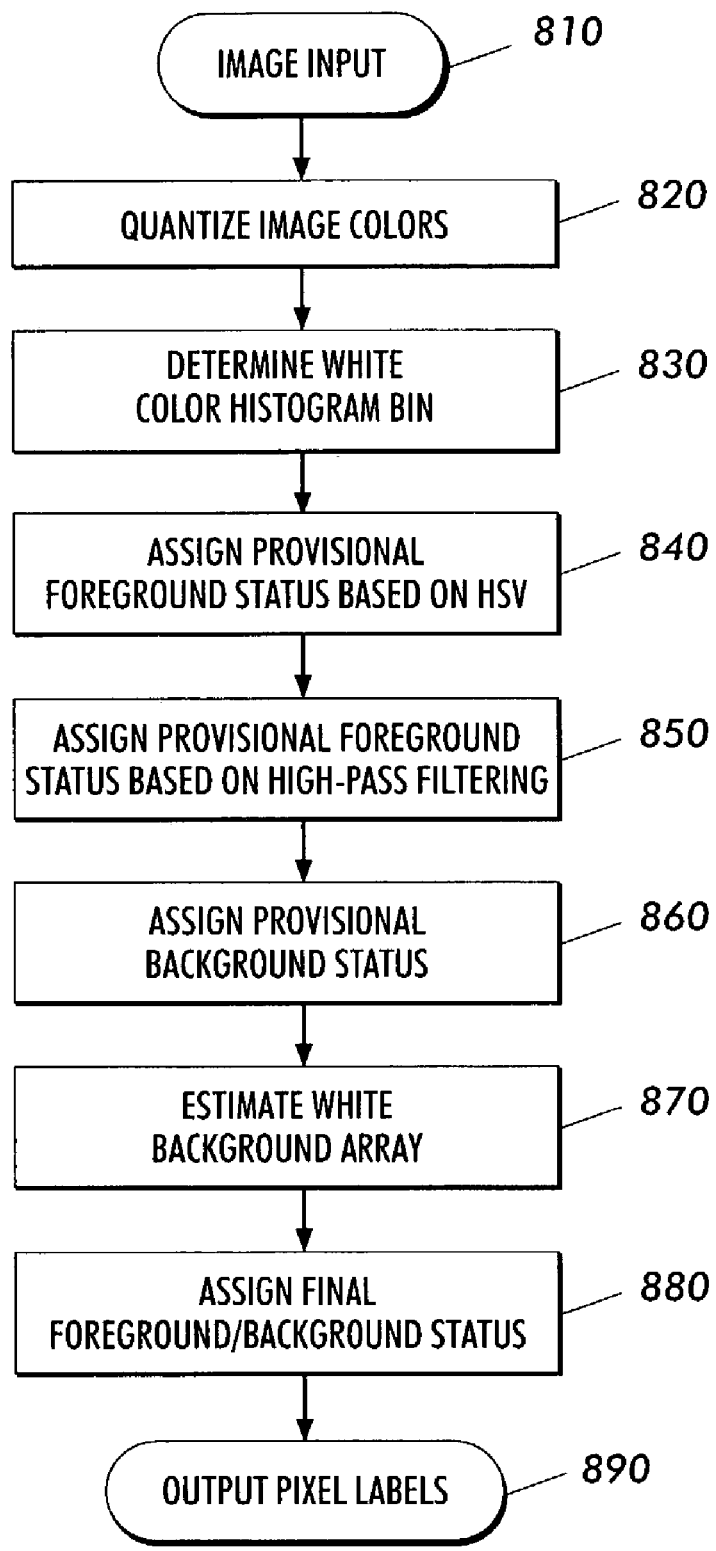
FIG. 8 is a flow chart showing steps in separating foreground and background pixels in electronic image material according to another embodiment of the method and system disclosed herein.

Referring now to FIG. 8, there is shown a flow chart illustrating the steps in distinguishing foreground markings from background in an electronic image material according to another embodiment of the method and system disclosed herein. The foreground/background separation process begins with receipt of an image from an image-input means at step 810, into original image data memory 662. As discussed hereinabove, the image may be received from a scanner, a facsimile receiver or other image receiver, a camera, or other appropriate device, or could be a part of local or remote memory that stores an image in digital form.

In steps 820 through 860 pixels are classified as "provisional foreground" or "provisional background". This status is represented in the provisional foreground/background mask 664. In step 820 the image's pixel colors are quantized to a limited set of RGB values using means for postering images that are well known to those skilled in the art, yielding a coarse color table 674. Coarse color table 674 may include any desired number of colors. At step 830, the color table bin most likely to represent white is determined based on RGB value and the number of pixels having that value. At step 840 image pixels having dissimilar Hue/Saturation/Lightness (HSV) values to the color table entry estimated to represent white are assigned "provisional foreground" status. One possible approach may utilize a simple weighted distance measure in HSV coordinates, but other forms of similarity measures are also contemplated. At step 850, high-pass filtering and thresholding are performed to determine locally darker pixels. The set of locally darker pixels is expanded by morphological dilation, and the resulting pixels are assigned "provisional foreground" status. At step 860 all pixels not assigned "provisional foreground" status at step 840 or step 850 are assigned "provisional background" status.

At step 870 an estimation of the white background pixel array 670 is made by smoothing and interpolating provisional background pixel RGB values. This step is described in U.S. patent application Ser. No. 09/158,443 to Saund et al. ("System and Method for Color Normalization of Board Images") assigned to the instant assignee and fully incorporated by reference. This smoothing may be performed using a four-pass, line-by-line then column-by-column, exponential smoothing kernel applied over background "white" pixel values. On the first such pass, the estimated "white" values for foreground pixel locations are taken as the value of preceding pixel.

At step 880, final assignment of pixels' foreground/background status is performed by a process similar to steps 840 through 860. This status is represented in the final foreground/background mask 666. Foreground pixel assignments produced by the high-pass filter response of step 850 are merged with foreground pixel assignments resulting from an HSV comparison of each original image pixel's value against the local background white estimate produced at step 870, using a simple weighted distance. All pixels not labeled as "foreground pixels" are labeled "background pixels". This pixel labeling of the foreground/background mask 666 is output at step 890.

Figure 9:
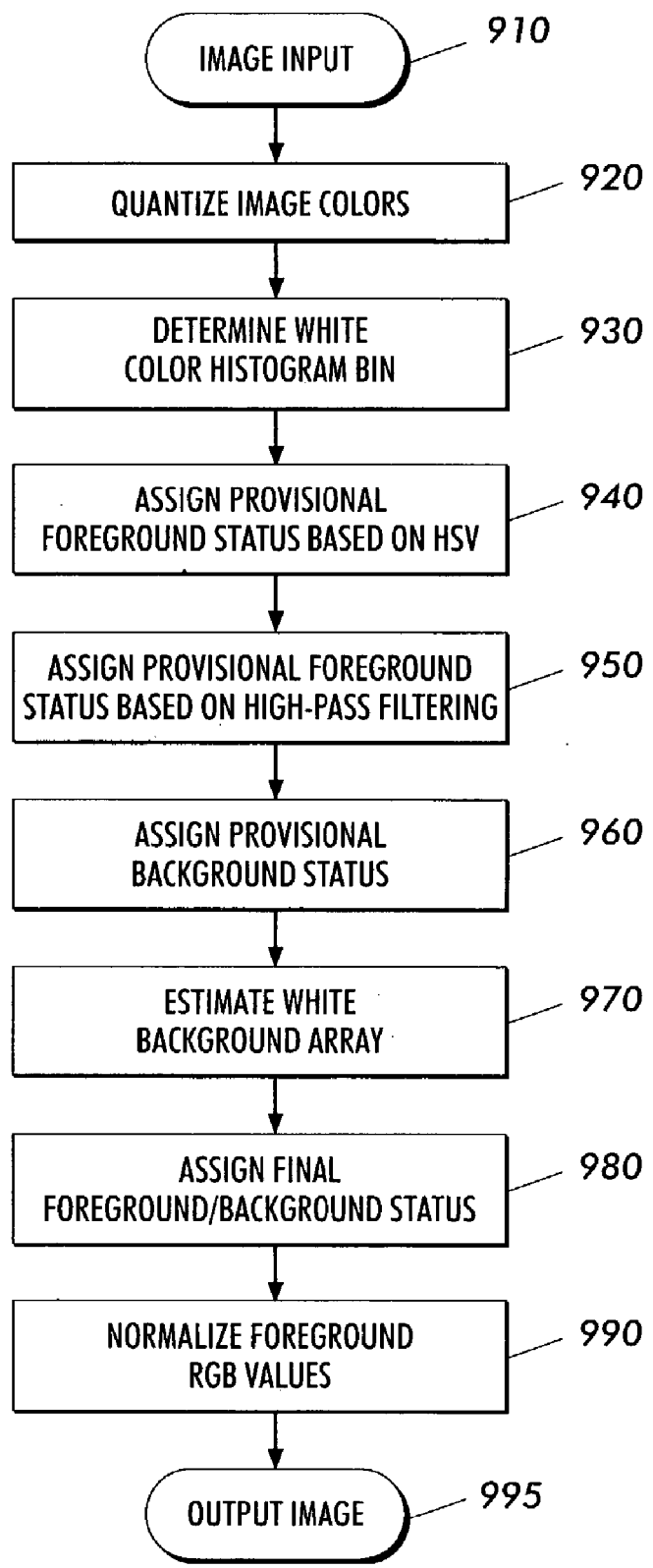
FIG. 9 is a flow chart showing steps in normalizing color in electronic image material according to a third embodiment of the method and system disclosed herein.

Turning now to FIG. 9, there is shown a flow chart illustrating the steps in performing color enhancement in an electronic image according to a third embodiment of the method and system disclosed herein. The color enhancement process begins with receipt of an image from an image-input means at step 910 into original image data memory 662. As discussed hereinabove, the image may be received from a scanner, a facsimile receiver or other image receiver, a camera, or other appropriate device, or could be a part of local or remote memory that stores an image in digital form. In steps 920 through 960 pixels are classified as "provisional foreground" or "provisional background". This status is represented in the provisional foreground/background mask 664. In step 920 the image's pixel colors are quantized to a limited set of RGB values using means for posterizing images that are well known to those skilled in the art, yielding a coarse color table 674. Any useful number of color values may be employed in the color table. At step 930, the color table bin most likely to represent white is determined based on RGB (red, green, blue) value and the number of pixels having that value.

At step 940 image pixels having dissimilar HSV values to the color table entry estimated to represent white are assigned "provisional foreground" status. One possible approach may utilize a simple weighted distance measure in HSV coordinates, but other forms of similarity measure are contemplated. At step 950, high-pass filtering and thresholding are performed to determine locally darker pixels. The set of locally darker pixels is expanded by morphological dilation, and the resulting pixels are assigned "provisional foreground" status. At step 960 all pixels not assigned "provisional foreground" status at step 940 or step 950 are assigned "provisional background" status.

At step 970 an estimation of the white background pixel array 670 is made by smoothing and interpolating provisional background pixel RGB values. This step is described in U.S. patent application Ser. No. 09/158,443 to Saund et al. ("System and Method for Color Normalization of Board Images") assigned to the instant assignee and fully incorporated by reference. This smoothing may be performed using a four-pass, line-by-line then column-by-column, exponential smoothing kernel applied over background "white" pixel values. On the first such pass, the estimated "white" values for foreground pixel locations are taken as the value of the preceding pixel.

At step 980, final assignment of pixels' foreground/background status is performed by a process similar to step 940 through step 960. This status is represented in the final foreground/background mask 666. Foreground pixel assignments produced by the high-pass filter response of step 950 are merged with foreground pixel assignments resulting from an HSV comparison of each original image pixel's value against the local background white estimate produced at step 970, using a simple weighted distance. All pixels not labeled as "foreground pixels" are labeled "background pixels". At step 990 color normalization is performed. The RGB values of foreground pixels are adjusted by dividing each pixel's original RGB by the RGB of the estimated white background at that pixel's location, which was produced in step 970. The resulting output image is produced at step 995.

Figure 10:
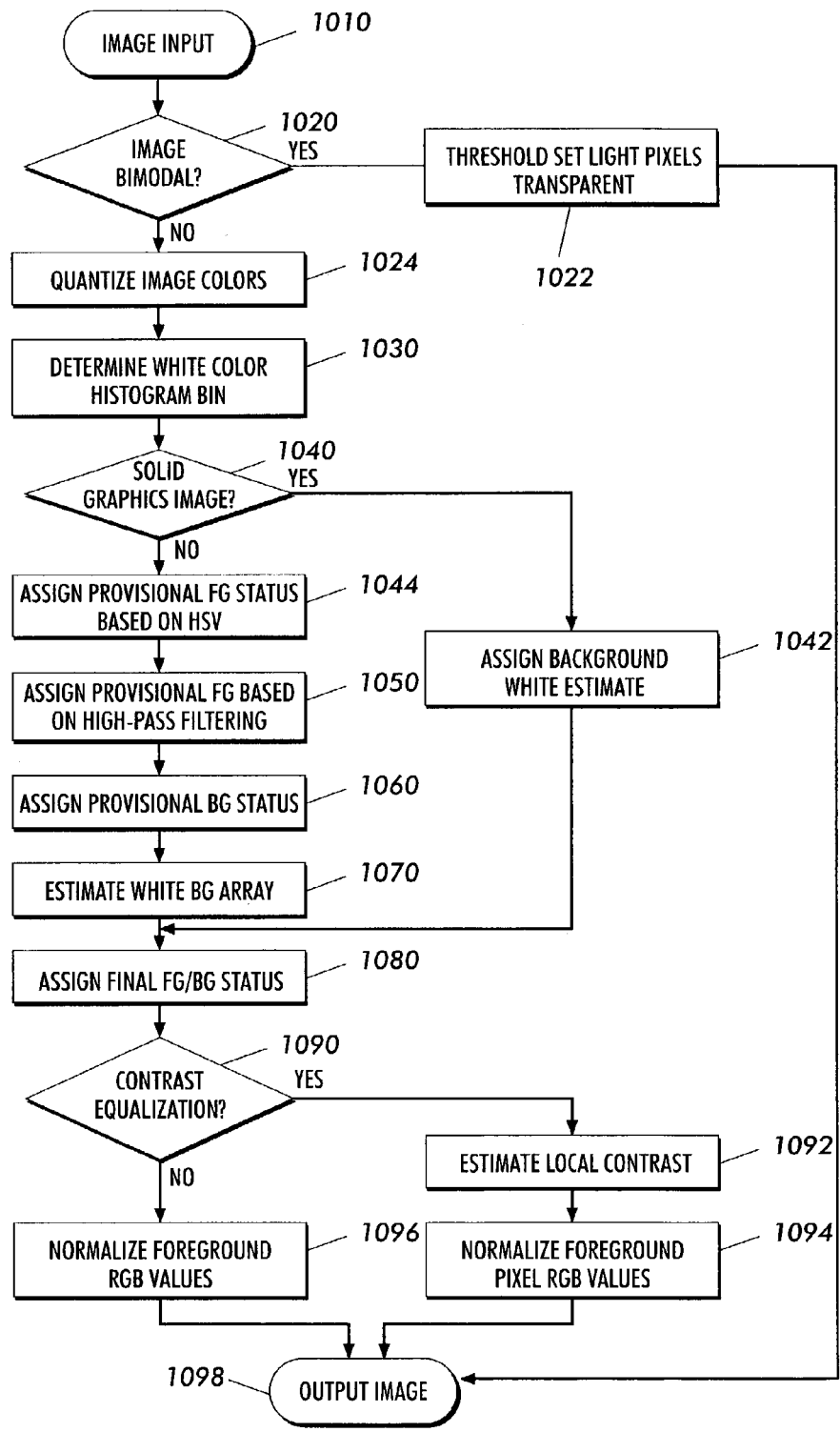
FIG. 10 is a flow chart showing steps in normalizing color in electronic image material according to a fourth embodiment of the method and system disclosed herein.

Turning now to FIG. 10, there is shown a flow chart illustrating the steps in enhancing color in electronic image material according to yet another embodiment of the method and system disclosed herein, in which the optional features of detecting and specially processing a bimodal image, of detecting and specially processing a solid graphics image, and of user-directed contrast equalization are illustrated. The color enhancement process begins with receipt of an image from an image-input means at step 1010 into original image data memory 662. As discussed hereinabove, the image may be received from a scanner, a facsimile receiver or other image receiver, a camera, or other appropriate device, or could be a part of local or remote memory that stores an image in digital form. At step 1020, a determination is made as to whether an image is bimodal, whereby the large majority of pixels are similar in lightness to one of two values (light and dark) and relatively few pixels have lightnesses between these. This is determined by examining the histogram of pixels' lightnesses, and detecting whether or not this histogram is bimodal, containing two clusters of pixel lightness values. This can be done using any of various techniques known in the art. If the image is bimodal, then at step 1022, white pixels are set as being transparent according to a threshold which is set automatically as a lightness value falling midway between the lightness clusters detected in the lightness histogram.

If an image is not bimodal, at steps 1024 through 1060 pixels are classified as "provisional foreground" or "provisional background". This status is represented in the provisional foreground/background mask 664. In step 1024 the image's pixel colors are quantized to a limited set of RGB values using means for posterizing images that are well known to those skilled in the art, yielding a coarse color table 674, containing any desired number of colors. At step 1030, the color table bin most likely to represent white is determined based on RGB (red, green, blue) value and the number of pixels having that value. A determination is made at step 1040 as to whether the image is to be considered of the type "solid graphics" by examining the statistics of pixels' errors in RGB values compared to their assigned quantized color table bins. Images for which in the aggregate, pixels' RGB values do not deviate greatly from the RGB values of their assigned bins, are considered to be of the type "solid graphics". If the image is determined to be of the solid graphics type, then at step 1042 the background white estimate image 670 is assigned a uniform RGB value consisting of the RGB value of the color table entry estimated to represent white at step 1030.

If the image is not of the solid graphics type, then processing proceeds to steps 1044 through 1070. At step 1044 image pixels having dissimilar HSV values to the color table entry estimated to represent white are assigned "provisional foreground" status. A simple weighted distance measure in HSV coordinates may be employed for such determination, but other forms of similarity measure are also contemplated. At step 1050, high-pass filtering and thresholding are performed to determine locally darker pixels. The set of locally darker pixels is expanded by morphological dilation, and the resulting pixels are assigned "provisional foreground" status. At step 1060 all pixels not assigned "provisional foreground" status at step 1040 or step 1050 are assigned "provisional background" status.

At step 1070 an estimation of the white background pixel array is made by smoothing and interpolating provisional background pixel values. This step is described in U.S. patent application Ser. No. 09/158,443 to Saund et al. ("System and Method for Color Normalization of Board Images") assigned to the instant assignee and fully incorporated by reference. This smoothing may be performed using a four-pass, line-by-line then column-by-column, exponential smoothing kernel applied over background "white" pixel values. On the first such pass, the estimated "white" values for foreground pixel locations are taken as the value of the preceding pixel.

At step 1080, final assignment of pixels' foreground/background status is performed by a process similar to steps 1044 through 1060. This status is represented in the final foreground/background mask 666. Foreground pixel assignments produced by the high-pass filter response of step 1050 are merged with foreground pixel assignments resulting from an HSV comparison of each original image pixel's value against the local background white estimate produced at step 1070, using a simple weighted distance. All pixels not labeled as "foreground pixels" are labeled "background pixels".

At step 1090 the program checks the value of the input parameter determining whether contrast equalization is to be performed. If contrast equalization is to be performed, at step 1092 an estimate of local contrast is initiated. The absolute value of a high-pass filtering of image lightness is computed and the resolution of this abs-high-pass image is reduced by an integer factor, n, assigning each result pixel the maximum value in its corresponding n×n region of the abs-high-pass image. This sub-sampled image is then smoothed and a local contrast enhancement factor based on estimated local contrast and target contrast is determined. At step 1094, the RGB of foreground pixels is adjusted by dividing the original RGB values by the RGB values of the estimated white background 670. Finally, foreground pixels' RGB differences from white are magnified by the local contrast enhancement factor. If contrast equalization is not to be performed, at step 1096 color normalization is performed. The RGB values of foreground pixels are adjusted by dividing each pixel's original RGB value by the RGB values of the estimated white background 670 at that pixel's location. The resulting output image is produced at step 1098.

Figure 1:
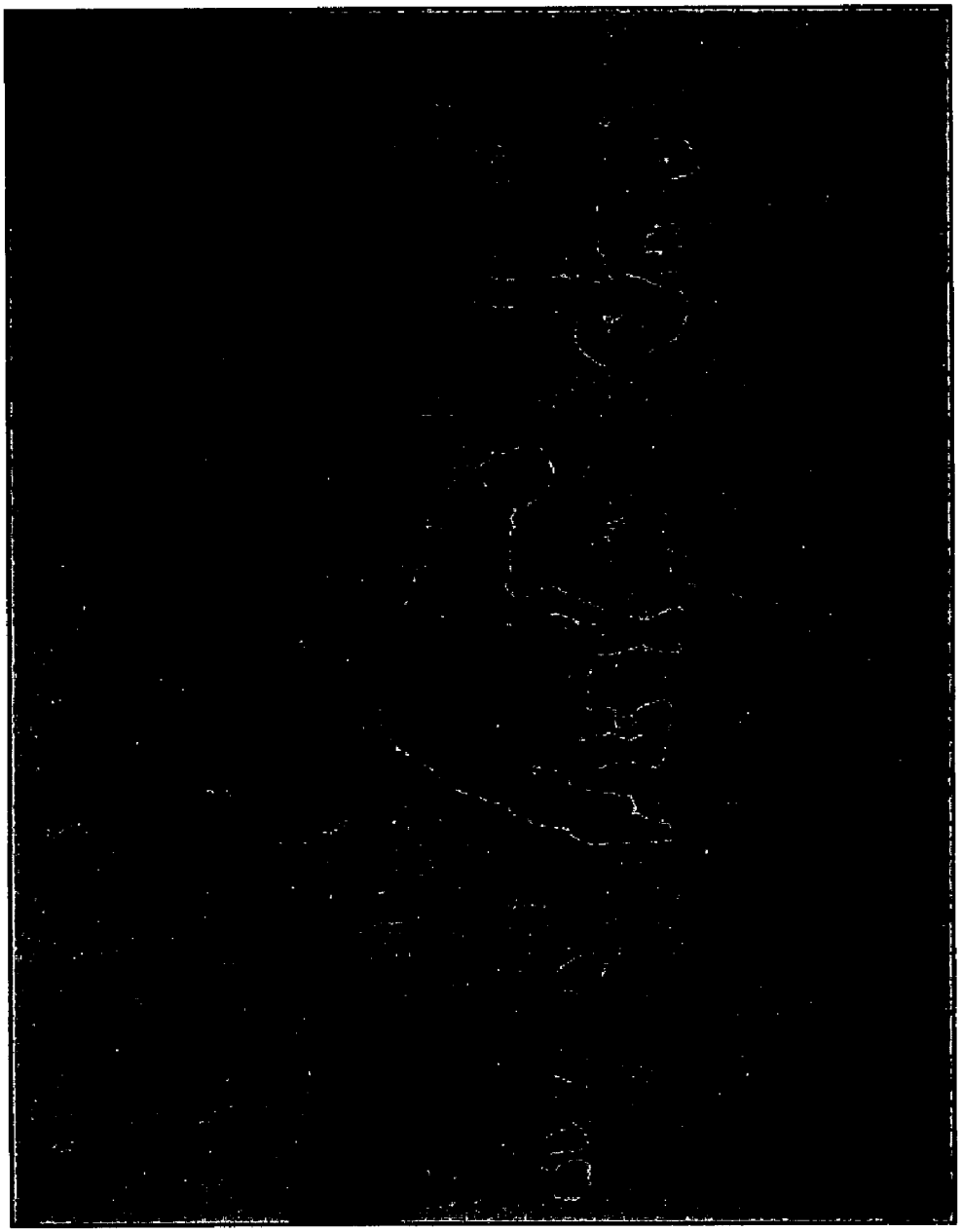
FIG. 1 is a digital camera image of hand-drawn artwork containing both line art and solid color regions.
Figure 2:
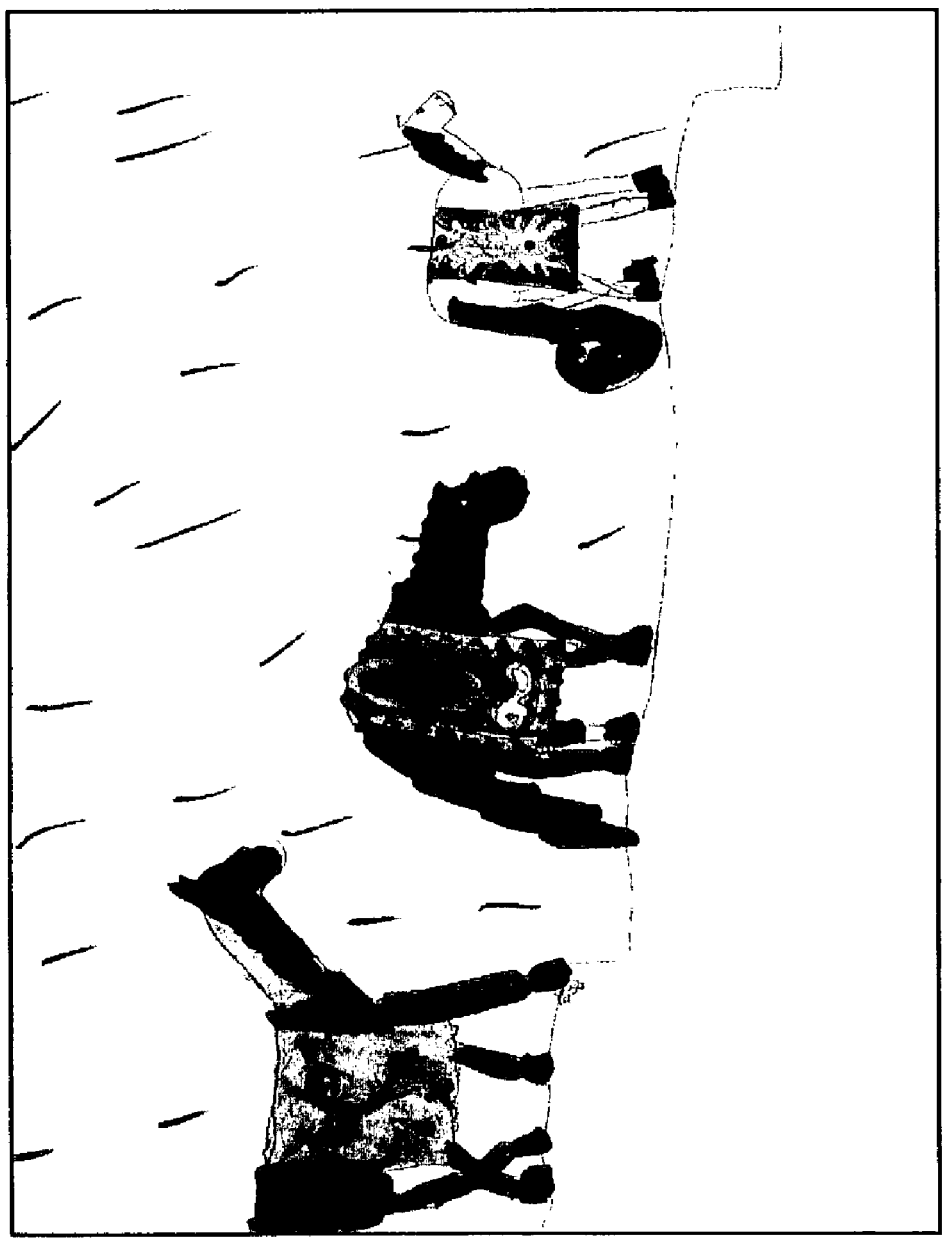
FIG. 2 is a scanned image of the original of the document shown in FIG. 1.
Figure 3:
FIG. 3 is the image of FIG. 1 processed with Autobalance.
Figure 4:
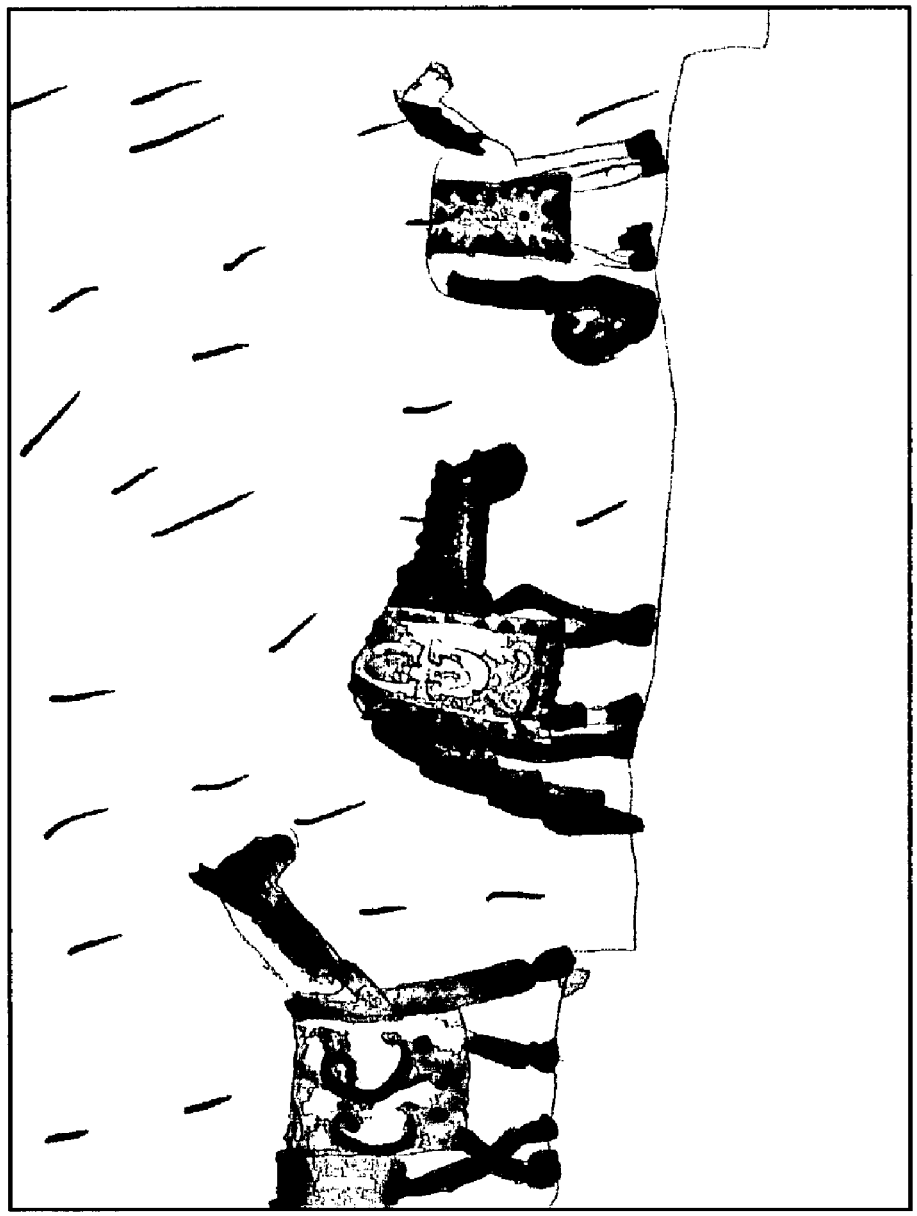
FIG. 4 is the image of FIG. 1 after application of Whiteboard Photo.
Figure 5:
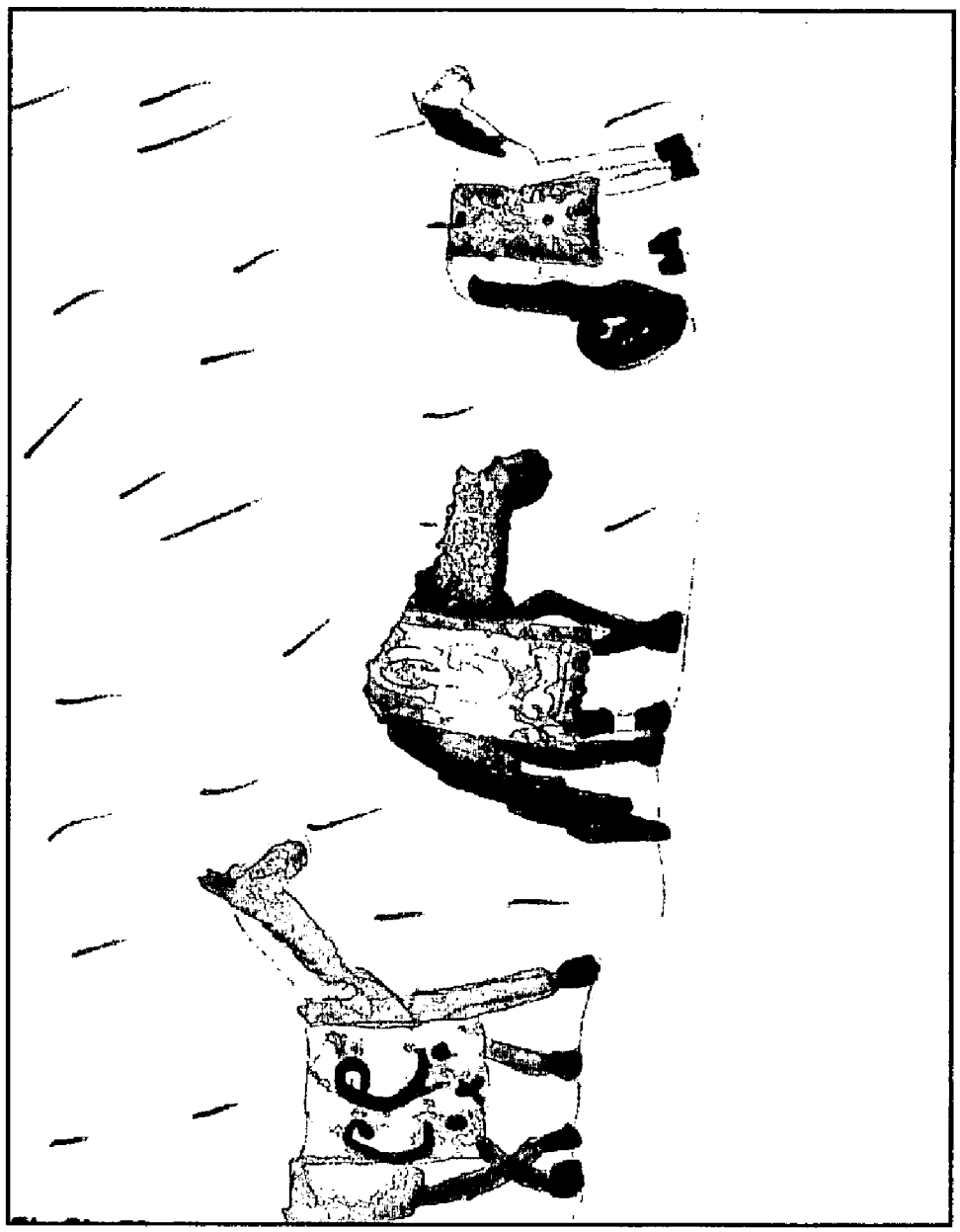
FIG. 5 is the image of FIG. 1 after application of ZombieBoard.
Figure 11:
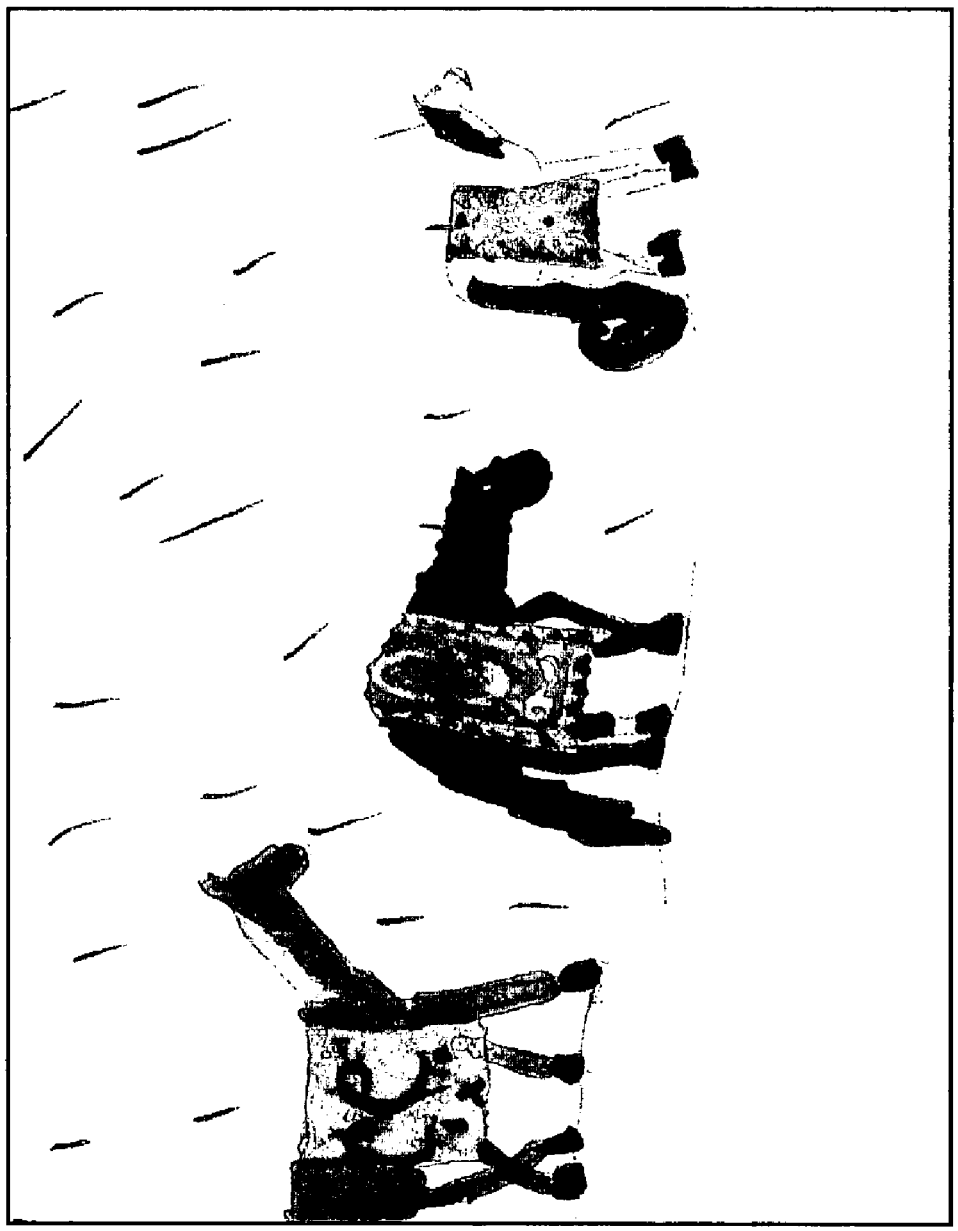
FIG. 11 is the image of FIG. 1 after application of the method and system disclosed herein.

The result of this process can be seen in FIG. 11, in which the background is white and the solid color regions of the animals and blankets are rendered closer in color and color distribution to the original image of FIG. 2.

While the present invention has been illustrated and described with reference to specific embodiments, further modification and improvements will occur to those skilled in the art. For example, useful embodiments of the invention may be obtained from any combination of the optional features of detecting and specially processing a bimodal image, of detecting and specially processing a solid graphics image, and of user-directed contrast equalization. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed is:

1. A method for enhancement of electronic images of a document, the electronic images having a background with foreground markings placed thereon, the method comprising:

receiving an electronic image comprised of pixels;

assigning initial provisional foreground/background status to said pixels to form an initial foreground/background estimate;

revising said initial foreground/background estimate to form a revised foreground/background estimate;

determining whether said revised foreground/background estimate is the final foreground/background assignment for said pixels;

repeating revising said revised foreground/background estimate until said final foreground/background assignment for said pixels is achieved; and providing said final foreground/background assignment for said pixels.

2. The method for enhancement of electronic images of a document according to claim 1, wherein assigning said initial foreground/background estimate comprises:
   quantizing image colors to yield a color table for said pixels wherein said color table is comprised of a plurality of color table bins;
   identifying not less than one of said color table bins most likely to represent white; and
   assigning provisional foreground status to a first plurality of said pixels based on an HSV comparison.

3. The method for enhancement of electronic images of a document according to claim 1, wherein revising said initial foreground/background estimate comprises:
   assigning provisional foreground status to a second plurality of said pixels based on high-pass filtering;
   assigning provisional background status to pixels not assigned provisional foreground status; and
   estimating a white background pixel array.

4. The method for enhancement of electronic images of a document according to claim 2, wherein quantizing image colors comprises utilizing means for postering images.

5. The method for enhancement of electronic images of a document according to claim 2, wherein identifying not less than one of said color table bins most likely to represent white is based on RGB value and the number of pixels having that value.

6. The method for enhancement of electronic images of a document according to claim 2, wherein assigning provisional foreground stains to a first plurality of said pixels based on an HSV comparison comprises identifying image pixels having HSV values dissimilar to the not less than one color table bin estimated to represent white.

7. The method for enhancement of electronic images of a document according to claim 3, wherein assigning provisional foreground status to a second plurality of said pixels based on high-pass filtering comprises determining locally darker pixels.

8. The method for enhancement of electronic images of a document according to claim 3, wherein estimating a white background pixel array comprises smoothing and interpolating provisional background pixel RGB values.

9. The method for enhancement of electronic images of a document according to claim 1, wherein providing final foreground/background status for said pixels comprises:
   merging foreground pixel assignments produced by high-pass filtering with foreground pixel assignments resulting from an HSV comparison; and
   labeling as background pixels all pixels not labeled as foreground pixels.

10. The method for enhancement of electronic images of a document according to claim 1, further comprising normalizing foreground pixel RGB values.

11. The method for enhancement of electronic images of a document according to claim 10, wherein normalizing foreground pixel RGB values comprises dividing each said pixel's original RGB value by the RGB value of the estimated white background at said pixel's location.

12. The method for enhancement of electronic images of a document according to claim 1, further comprising determining whether said image is bimodal.

13. The method for enhancement of electronic images of a document according to claim 12, wherein determining whether said image is bimodal comprises detecting whether the color histogram for said image contains not more than two clusters of pixel lightness values.

14. The method for enhancement of electronic images of a document according to claim 12, further comprising setting light pixels as transparent for said bimodal image.

15. The method for enhancement of electronic images of a document according to claim 1, further comprising determining whether an image is of a type, said type being a solid graphics image.

16. The method for enhancement of electronic images of a document according to claim 15, wherein determining whether an image is of said solid graphics type comprises examining the statistics of said pixels' errors in RGB values compared to said pixels' assigned quantized color table bins.

17. The method for enhancement of electronic images of a document according to claim 15, further comprising assigning a background white estimate to images determined to be of said solid graphics type.

18. The method for enhancement of electronic images of a document according to claim 15, further comprising, for images found to be not of said solid graphics type:
   assigning provisional foreground status to pixels based on an HSV comparison;
   assigning provisional foreground status based on high-pass filtering;
   assigning provisional background status; and
   estimating a white background array.

19. The method for enhancement of electronic images of a document according to claim 1, further comprising performing contrast equalization.

20. The method for enhancement of electronic images of a document according to claim 19, wherein performing contrast equalization comprises:
   estimating local contrast; and
   normalizing foreground pixel RGB values so as to equalize contrast.

21. A system adapted to enhance electronic images of a document, the electronic images having a background with foreground markings placed thereon, the system comprising:
   means for inputting an electronic image comprised of pixels;
   means for inputting algorithm parameters;
   a processor, connected for receiving requests for image enhancement and for accessing a memory structure;
   program memory means including not less than one foreground/background separation module, wherein said foreground/background separation module assigns initial provisional foreground/background status to said pixels, revises said initial foreground/background status, determines whether said revised foreground/background status is the final foreground/background assignment for said pixels, and repeats revising said revised foreground/background status until a final foreground/background assignment for said pixels is obtained; and
   data memory means.

22. The system adapted to enhance electronic images of a document according to claim 21, wherein said electronic image comprises an image stored in digital form in said data memory.

23. The system adapted to enhance electronic images of a document according to claim 21, wherein said algorithm parameters are received from a previously stored file.

24. The system adapted to enhance electronic images of a document according to claim 21, wherein said algorithm parameters are received from a graphical user interface.

25. The system adapted to enhance electronic images of a document according to claim 21, wherein said program memory means further comprises a local contrast estimation module.

26. The system adapted to enhance electronic images of a document according to claim 21, further comprising image output means.

27. The system adapted to enhance electronic images of a document according to claim 21, wherein said processor is configured as a windows-type system.

28. The system adapted to enhance electronic images of a document according to claim 21, wherein said program memory module further comprises a color normalization module.

29. An article of manufacture comprising a computer readable medium having computer readable program code embodied in said medium which, when said program code is executed by said computer causes said computer to perform method steps for enhancement of electronic images of a document, the electronic images having a background with foreground markings placed thereon, said method comprising:

receiving an electronic image comprised of pixels;

assigning initial provisional foreground/background status to said pixels to form an initial foreground/background estimate;

revising said initial foreground/background estimate to form a revised foreground/background estimate;

determining whether said revised foreground/background estimate is the final foreground/background assignment for said pixels;

repeating revising said revised foreground/background estimate until said final foreground/background assignment for said pixels is achieved; and providing said final foreground/background assignment for said pixels.

* * * * *

UNITED STATES PATENT AND TRADEMARK OFFICE
CERTIFICATE OF CORRECTION

PATENT NO. : 7,177,483 B2 Page 1 of 1
APPLICATION NO. : 10/396223
DATED : February 13, 2007
INVENTOR(S) : Saund It is certified that error appears in the above-identified patent and that said Letters Patent is hereby corrected as shown below:

Title page item 73 should read
(73) Assignee: Palo Alto Research Center Incorporated, Palo Alto, CA (US)

Signed and Sealed this

Second Day of September, 2008

JON W. DUDAS
*Director of the United States Patent and Trademark Office*